J. M. ANDERSON, I. HIGGINS & G. W. DANNER.
TRIPLE FURROWERS.

No. 185,658. Patented Dec. 26, 1876.

WITNESSES:
H. Rydquist
John Goethals.

INVENTOR:
J. M. Anderson
I. Higgins
BY G. W. Danner
ATTORNEYS.

N. PETERS, PHOTO-LITHOGRAPHER, WASHINGTON, D. C.

UNITED STATES PATENT OFFICE.

JAMES M. ANDERSON, ISAAC HIGGINS, AND GEORGE W. DANNER, OF HOMER, INDIANA.

IMPROVEMENT IN TRIPLE-FURROWERS.

Specification forming part of Letters Patent No. 185,658, dated December 26, 1876; application filed July 11, 1876.

*To all whom it may concern:*

Figure 1:
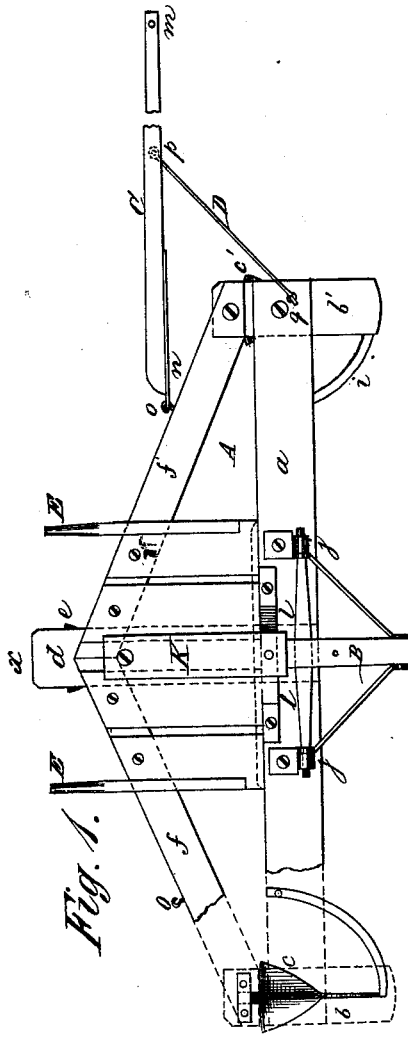
Figure 2:
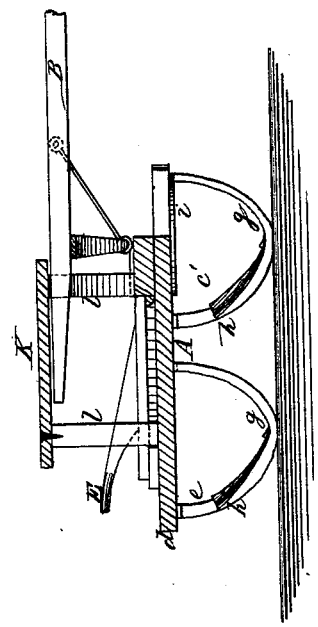

Be it known that we, JAMES M. ANDERSON, ISAAC HIGGINS, and GEORGE W. DANNER, of Homer, in the county of Rush and State of Indiana, have invented a new and Improved Triple-Furrower, of which the following is a specification:

Figure 1 is a plan. Fig. 2 is a section on line $x\ x$ in Fig. 1.

Similar letters of reference indicate corresponding parts.

Our invention relates to an implement for making simultaneously three furrows, and marking for the central one in the next row of furrows to be made.

The invention will first be described in connection with drawing, and then pointed out in the claims.

A is a frame, consisting of the bars $a$, having the cross-pieces $b\ b'$ at its ends, and the part $d$, which extends from the center of the bar $a$ backward, and the diagonal braces $f f'$, which connect the cross-pieces $b\ b'$ and the rear end of the part $d$. $c\ c'$ are plows, which are attached to the cross-pieces $b\ b'$, and $e$ is a plow attached to the rear end of the part $d$. The plows or teeth $c\ c'$ and $e$ consist of a hyperboliform supporting-iron, $g$, having a triangular plate, $h$, attached to the inner edge of the rear arm, the point of which extends to the lowest point of the supporting-iron, where it is embraced by a slit cut in the iron $g$. The upper end of the plate $h$ is riveted or bolted to the supporting-iron $g$, and the sides of the said plate are bent back so as to present a convex or angular front.

The advancing edge of the supporting-iron $g$ is sharpened, so that it may easily cut its way through the soil. An extension of this part of the iron on the plows $c\ c'$ forms the brace $i$.

The tongue B is jointed to the frame A at $j j$. The shaft of the tongue extends backward beyond the point of attachment to the frame A, and its motion is limited by a plank, $k$, which is supported above the frame by the standards $l$. C is an arm, which carries the marking-point $m$, and is provided with an eye, $n$, that engages with a hook, $o$, on the rear of the frame A. D is a brace-rod, having an eye at each end, and engaging with the hook $p$ on the arm C and the hook $q$ on the frame A, holding the arm C parallel with a line drawn through the plows $c\ c'$. E E are handles attached to the frame A for convenience in handling the implement.

Our implement will make furrows of sufficient depth for planting corn or other grain in furrows or hills. It will make furrows of uniform depth on any kind of ground. It will pass over obstructions without danger of catching, and will mark for the next row of furrows, so that they may be made equally distant and parallel.

Having thus described our invention, we claim as new and desire to secure by Letters Patent—

1. The combination, with guard $g$, of support $h$, provided with the brace-extension $i$, substantially as and for the purpose specified.

2. The combination of the iron $g$, plate $h$, brace $i$, and frame A, as shown and described.

JAMES M. ANDERSON.
ISAAC HIGGINS.
GEORGE W. DANNER.

Witnesses:
WILLIAM B. HEFLIN,
AARON N. LINNES.